UNITED STATES PATENT OFFICE.

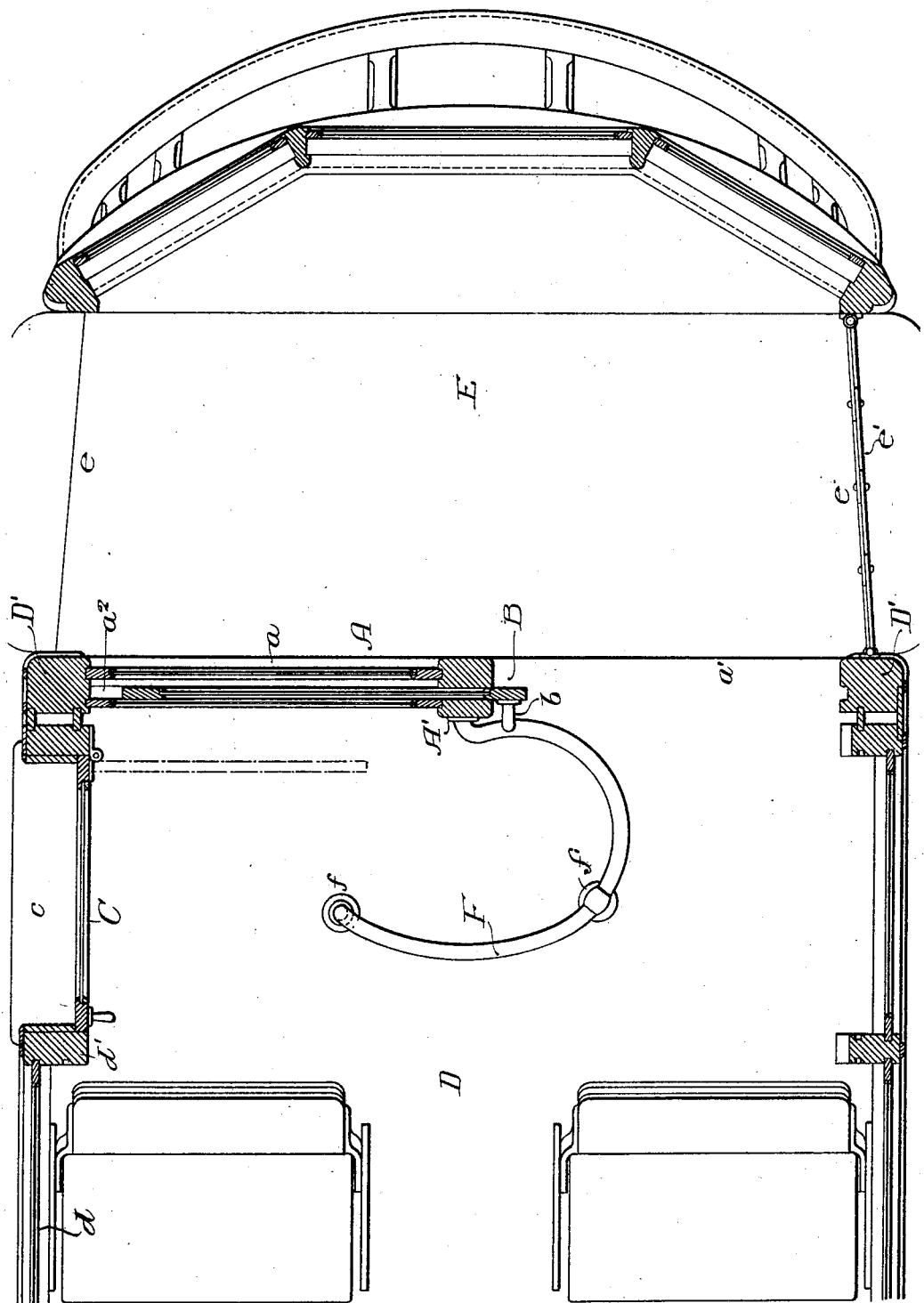

HENRY HOWSON, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

PASSENGER-CAR.

No. 902,405.  Specification of Letters Patent.  Patented Oct. 27, 1908.

Application filed May 12, 1908. Serial No. 432,537.

*To all whom it may concern:*

Be it known that I, HENRY HOWSON, a citizen of the United States, residing in Philadelphia, Pennsylvania, have invented certain Improvements in Passenger-Cars, of which the following is a specification.

One object of my invention is to convert the ordinary passenger car having a narrow platform into a car in which the passenger pays the fare before entering the car, and which requires more space at the platform than provided in the ordinary car, although a car may be constructed in the first place according to my invention.

A further object of the invention is to provide for the closing of the body portion of the car and to provide a space within the car for the conductor.

These objects I attain in the following manner, reference being had to the accompanying drawing, in which the figure is a sectional plan view of a car illustrating my invention.

D is the body of the car.

E is the platform separated from the body of the car by a transverse partition A. The partition has a panel section $a$ and a doorway $a'$. This doorway is comparatively wide so as to allow for the free ingress of passengers from the platform to the body of the car. The panel section $a$ is double in the present instance, forming a channel $a^2$ for a sliding door B. This sliding door is of such a width as to completely close the ingress passageway $a'$ when desired, and has a handle $b$ which can be grasped by the conductor who controls the opening and closing of the door.

C is the door closing the egress passageway $c$ in the side $d$ of the car and this egress passageway, in the present instance, is between the corner post D' and the first side post $d'$. The door preferably swings into the car, as illustrated by dotted lines, and is within easy reach of the conductor.

In order to divide the ingress passageway from the egress passageway I provide a guard F within the body of the car, and I preferably form this guard of a rail supported on the central post A' of the partition A and on posts $f, f'$, secured to the floor of the body portion. The rail is preferably curved, as shown, so that there will be sufficient room for the conductor to give him space to reach across the doorway $a'$ to open the door B when necessary and the space within the rail is open at the exit side so that the conductor can readily reach the door G to open and close it, if necessary, although in some instances both the sliding door B and the pivoted egress door C may be opened and closed by any suitable mechanism operated by the conductor, if found desirable.

As shown in the drawing, this invention is particularly adapted to converting the ordinary type of passenger car into a car in which the passengers pay their fares upon entering the car, the platform remaining the same size and the opening being placed in the side of the car for the egress of passengers. If a car is designed especially on these lines then the seats may be differently arranged and some space may be provided, if found necessary, for the conductor within the car and the inclosure may be differently shaped.

In the figure of the drawing the parts are in the position when the platform is at the rear of the car, the door B being moved back and the door C closed and one side $e'$ of the platform is closed by a movable guard $e'$ or by a door, as desired. The conductor can close the door B after the ingress of a passenger, if desired, so as to entirely close the rear of the car. When the platform is at the forward end of the car then the door C is closed and the side $e$ of the platform can be closed by a guard or a door, and the side $e'$ can be opened, when desired, to allow for the egress of passengers at the forward end of the car. This guard or door would be under the control of the motorman. Thus it will be seen that with comparatively little expense I can readily convert the ordinary type of car into a car in which passengers pay their fares on entering, and I also provide the car with a wide ingress doorway, the conductor being located within the car.

I claim:—

1. The combination in a passenger car, of a body portion, a platform, a transverse partition dividing the body portion from the platform, said partition having a doorway at one side, a panel closing the other side of the partition so as to prevent ingress or egress of passengers at that side, a door arranged to close the doorway, and a guard within the body of the car extending to a point adjacent to the doorway and inclosing a space for the conductor.

2. The combination in a passenger car, of a body portion, a platform, a partition dividing the body portion from the platform, a doorway at one side of the partition, a panel closing the other side of the partition, a channel in the panel, a sliding door adapted to the channel and arranged to close the doorway, and a guard within the body of the car adjacent to the doorway inclosing the space for the conductor.

3. The combination in a passenger car, of a body portion, a platform, a transverse partition dividing the body portion from the platform, a center post in said partition, a doorway extending from said center post to a corner post on one side of the car, and a fixed panel extending from the said post to the corner post on the opposite side of the car, a sliding door adapted to close the doorway in the partition, a guard adapted to the center post and extending into the body of the car and separating the space to be occupied by the conductor from the body of the car.

4. The combination in a passenger car, of a body portion, a platform, a transverse partition separating the body of the car from the platform, a doorway in one side of the partition, a door adapted to close said doorway, a doorway in the side of the car near the transverse partition, and a door closing said doorway.

5. The combination in a passenger car, of a body portion, a platform, a transverse partition separating the body portion from the platform, a wide doorway at one side of the partition, a sliding door adapted to close said doorway, a guard within the car inclosing the space for the conductor, a doorway in the side of the car adjacent to the said transverse partition, a pivoted door closing said doorway, both doors being within easy reach of the conductor so as to be under his control.

6. The combination in a passenger car, of a body portion, a platform, a transverse partition separating the body portion from the platform, an ingress doorway at one side of the partition, a sliding door adapted to close said doorway, a fixed panel in the balance of the partition, an egress doorway in the side of the car adjacent to the panel side of the said transverse partition, a pivoted door adapted to close the said doorway and pivoted to swing inwards towards the panel, a guard in front of the panel and extending into the inner edge of the ingress doorway.

7. The combination in a passenger car, of a body portion, a platform, a partition dividing the body portion from the platform, a doorway at one side of the partition, the other side of the partition being closed, a sliding door adapted to a channel in the partition and arranged to close the doorway, and a curved guard rail projecting into the car from a point about the middle of the partition arranged transversely so as to extend past the edge of the doorway and shaped to form an inclosure for the conductor.

In testimony whereof, I have signed my name to this specification, in the presence of two subscribing witnesses.

HENRY HOWSON.

Witnesses:
Jos. H. Klein,
Wm. A. Barr.